US 11,711,370 B2

(12) United States Patent
Ranjan et al.

(10) Patent No.: US 11,711,370 B2
(45) Date of Patent: Jul. 25, 2023

(54) AUTOMATIC TCAM PROFILES

(71) Applicant: Arista Networks, Inc., Santa Clara, CA (US)

(72) Inventors: Nishant Ranjan, Sunnyvale, CA (US); Peter Delevoryas, Santa Clara, CA (US); Denny Hung, Mountain View, CA (US)

(73) Assignee: Arista Networks, Inc., Santa Clara, CA (US)

( * ) Notice: Subject to any disclaimer, the term of this patent is extended or adjusted under 35 U.S.C. 154(b) by 275 days.

(21) Appl. No.: 16/874,029

(22) Filed: May 14, 2020

(65) Prior Publication Data
US 2021/0359997 A1   Nov. 18, 2021

(51) Int. Cl.
*H04L 9/40* (2022.01)
*G06F 13/40* (2006.01)
*G11C 15/00* (2006.01)

(52) U.S. Cl.
CPC ........ *H04L 63/101* (2013.01); *G06F 13/4022* (2013.01); *G11C 15/00* (2013.01); *H04L 63/102* (2013.01)

(58) Field of Classification Search
CPC ..... G11C 15/00; H04L 63/101; H04L 63/102; G06F 13/4022
See application file for complete search history.

(56) References Cited

U.S. PATENT DOCUMENTS

| | | | | |
|---|---|---|---|---|
| 6,651,096 | B1* | 11/2003 | Gai | ...... H04L 63/101 709/225 |
| 6,658,002 | B1* | 12/2003 | Ross | ...... H04L 47/2441 370/392 |
| 6,658,458 | B1* | 12/2003 | Gai | ...... G06F 16/90339 709/215 |
| 6,874,016 | B1* | 3/2005 | Gai | ...... H04L 29/06 709/215 |
| 7,133,914 | B1* | 11/2006 | Holbrook | ...... H04L 45/7453 709/224 |

(Continued)

FOREIGN PATENT DOCUMENTS

WO   WO-2018045862 A1 *  3/2018 ........... H04L 43/026

OTHER PUBLICATIONS

McKeown et al., "OpenFlow: Enabling Innovation in Campus Networks", ACM SIGCOMM Computer Communication Review, vol. 38, No. 2, Apr. 2008, pp. 69-74, Total pp. 6 (Year: 2008).*

*Primary Examiner* — Shah M Rahman
(74) *Attorney, Agent, or Firm* — Fountainhead Law Group P.C.

(57) ABSTRACT

A computer-implemented method for generating a ternary content addressable memory (TCAM) profile includes obtaining an access control list (ACL) configuration and generating the TCAM profile by parsing the ACL configuration. Based upon the parsing, one or more configuration features are identified, each of the features based upon a context and direction of packet flow identified in the configuration. The context includes an interface type and a routing configuration type. Based upon identifying each of the one or more configuration features, a corresponding feature is generated in the TCAM profile. At least one qualifier and at least one action associated with the respective feature is identified and associated with the feature in the TCAM profile.

21 Claims, 8 Drawing Sheets

(56) References Cited

U.S. PATENT DOCUMENTS

| | | | | |
|---|---|---|---|---|
| 7,904,642 | B1 * | 3/2011 | Gupta | G06F 16/90339 |
| | | | | 711/108 |
| 8,316,151 | B1 * | 11/2012 | Ammundi | H04L 69/22 |
| | | | | 709/239 |
| 2003/0225964 | A1 * | 12/2003 | Krishnan | G06F 21/604 |
| | | | | 711/108 |
| 2006/0104286 | A1 * | 5/2006 | Cheriton | G06F 16/9014 |
| | | | | 370/395.32 |
| 2006/0155875 | A1 * | 7/2006 | Cheriton | H04L 69/22 |
| | | | | 709/245 |
| 2006/0294297 | A1 * | 12/2006 | Gupta | G11C 15/00 |
| | | | | 711/108 |
| 2007/0022479 | A1 * | 1/2007 | Sikdar | H04L 63/0218 |
| | | | | 726/25 |
| 2007/0195778 | A1 * | 8/2007 | Tatar | H04L 49/1546 |
| | | | | 370/469 |
| 2013/0290622 | A1 * | 10/2013 | Dey | G06F 16/90339 |
| | | | | 711/108 |
| 2014/0082176 | A1 * | 3/2014 | Basso | H04L 45/7457 |
| | | | | 709/224 |
| 2014/0095782 | A1 * | 4/2014 | Koktan | H04L 45/60 |
| | | | | 711/108 |
| 2017/0085488 | A1 * | 3/2017 | Bhattacharya | H04L 41/0813 |
| 2017/0346765 | A1 * | 11/2017 | Immidi | H04L 49/354 |
| 2018/0278525 | A1 * | 9/2018 | Levy | H04L 45/7453 |
| 2020/0314179 | A1 * | 10/2020 | He | H04L 41/0813 |
| 2021/0359939 | A1 * | 11/2021 | Wan | H04L 45/74 |

* cited by examiner

US 11,711,370 B2

AUTOMATIC TCAM PROFILES

BACKGROUND

Security in computer networks is becoming more critical and complex as networks become more relied upon for communications in a variety of applications. Access control lists (ACLs) have been implemented in network devices to implement security policies including blocking or filtering unauthorized or potentially harmful network traffic from reaching or accessing particular network destinations. An ACL describes a set of packet match criteria and actions to take when a packet matches the specific criteria in the ACL's rules. ACLs may be implemented in a router or switch, for example, where security and/or routing policies are implemented based upon hundreds if not thousands of parameters (e.g., IP addresses) are implemented.

Ternary content addressable memories (TCAMs) are frequently used for rapidly processing network traffic functions of ACLs. TCAMs are specialized high speed memory components with programmable lookup tables capable of performing parallel lookups of numerous entries in the tables. The term "ternary" refers to the memory's ability to store and query data using three different inputs: 0, 1 and X (don't care). Lookups are typically of fixed length, also known as "key size" (KS). Because of their size and cost, use of them is limited and they are typically constrained and dedicated to higher priority packet processing. The tables, for example, may be used for determining traffic forwarding decisions and applying security and quality of service policies in routers and switches. While these tables are effective for rapidly handling increasing traffic demands and complex processing, network requirements can change on a frequent basis. Thus, regular reconfiguring of TCAMs may be necessary to effectively adapt to these changes.

Generating an effective TCAM profile may, however, require specialized skills/knowledge and a careful balancing of competing network policies and requirements. Network requirements may be expressed, for example, in entries of ACLs.

Typically, a specialized technician familiar with ACLs is needed to examine the rules and generate a new TCAM profile. Common match criteria may include attributes such as source/destination IP addresses, source/destination ports, the transport layer protocol used (i.e., TCP or UDP), packet length, and others. The process of developing and implementing a new TCAM profile can thus be complex, time consuming, and expensive.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
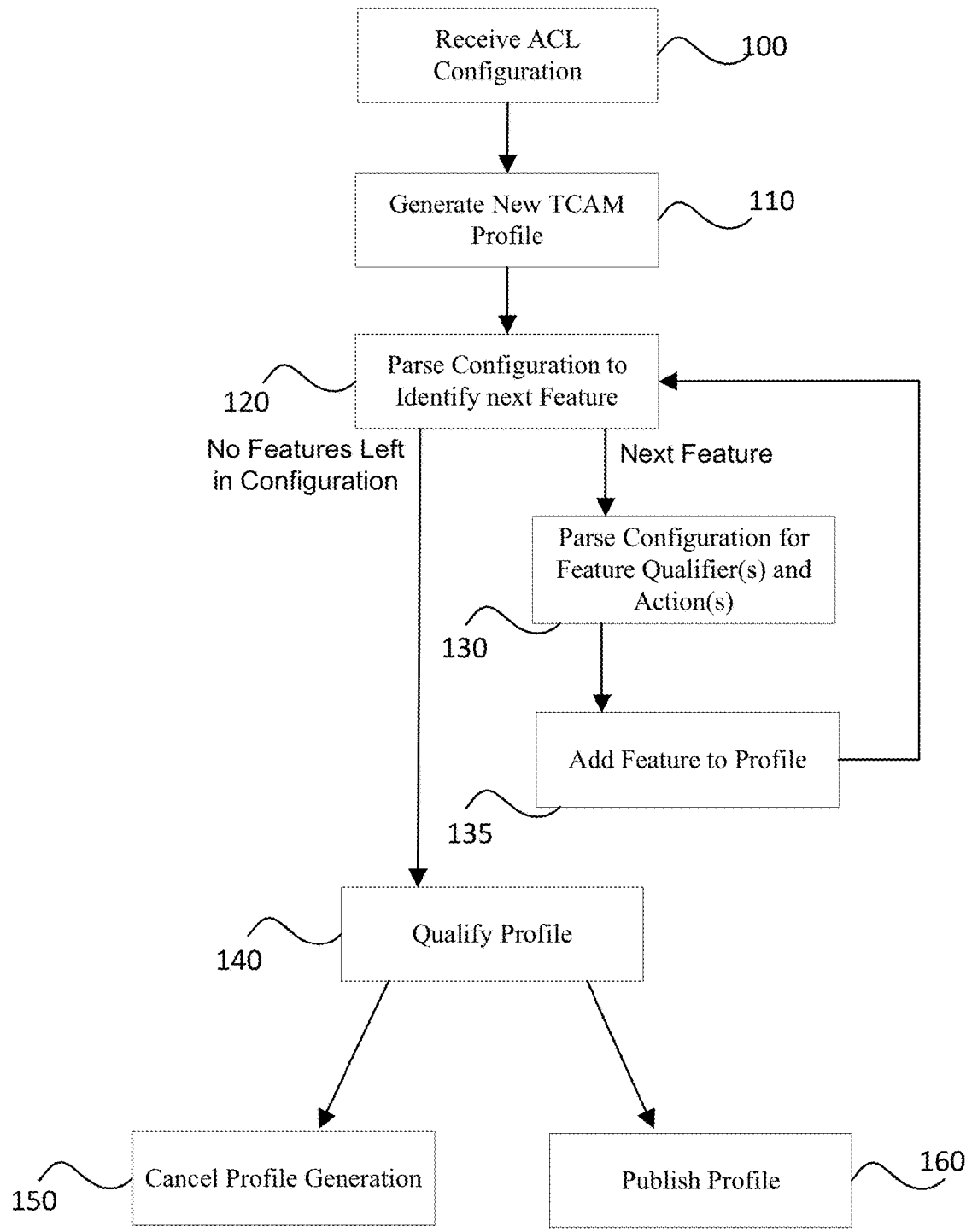
FIG. 1 is a flowchart of a process for generating a TCAM profile according to some embodiments.

In some computer-implemented approaches described herein, a new TCAM profile is automatically generated without requiring manual programming. In an approach, one or more ACL configurations are parsed and its sections categorized by features. A TCAM profile may be segmented into one or more of the identified features, and can later be programmed into a TCAM table. A feature may be generated by identifying a context and direction (i.e., ingress, egress of traffic) in a configuration section. A context may be identified by the applicable interface (e.g., routed-ports, sub-interfaces, VLANs) and type of configuration section (e.g., a security-based ACL section or policy-based ACL section). The context may include source/destination IP addresses, source/destination ports, the transport layer protocol used (i.e., TCP or UDP), packet length, and others. A context may further be differentiated by whether traffic is directed to a CPU (e.g., control plane).

The applicable ACL configuration section is further parsed to obtain a list of qualifiers and actions for each feature. A qualifier is a parameter that would be matched in a TCAM key for implementing a rule resulting in an action (or non-action). Parameters can include, for example, source and/or destination IP addresses, ports, etc. When a TCAM is utilized for performing matching, a qualifier may be obtained from packet header attributes and packet metadata that are attached to the packet as it travels through the packet processing pipeline or data from other lookup tables in the forwarding pipeline.

Parsing of configurations for particular fields or combinations of fields arranged in particular ways may be performed, for example, utilizing techniques known in the art. Programming languages having parsing functions include, for example, JAVA and JSON. In some embodiments, the parsing functions can be used to generate objects with elements that can be assigned to identified contexts, flow directions, qualifiers, actions, etc., and utilized to implement the techniques described herein.

In some embodiments, before each feature is added, the profile is analyzed to determine if a particular feature (e.g., a particular set of qualifiers and actions) has already been incorporated. A feature may have been previously incorporated, for example, based upon a cumulative/overlapping area of a configuration already being parsed. If the feature has already been added, the process can omit the addition of a cumulative feature in the profile.

In some embodiments, after all of the qualifiers for a feature are determined, a calculation is made of the width (in bytes) that the combination of qualifiers would require in a key of a TCAM. A comparison is made with the maximum width available in an applicable TCAM hardware key. If the combination of qualifiers exceeds the maximum TCAM key width, the configuration may be rejected. For example, some or all of a TCAM profile may not be generated based upon a rejection. In some embodiments, a notification is transmitted which indicates the failure and its reason, which may allow an operator to adjust the configuration accordingly.

Proceeding with the automated generation of a TCAM profile that is not rejected, a determination of the width of outputting the resulting action(s) (e.g., forward, drop, mirror a packet) in a TCAM is made. If the determined output width exceeds the width of the applicable TCAM output field, then a rejection of part or all of the TCAM profile may occur similar to that described for a qualifier-based rejection described herein.

The configuration may be parsed such as described until all applicable sections of the configuration have been processed (e.g., for which a TCAM profile section has been created or rejected) as described. A further determination is made calculating whether each of the generated TCAM profile features can be accommodated by the available TCAM memory. If the generated TCAM profile cannot be accommodated by the TCAM, the profile may be partially or entirely rejected similar to a qualifier-based profile rejection described herein.

Figure 8A:
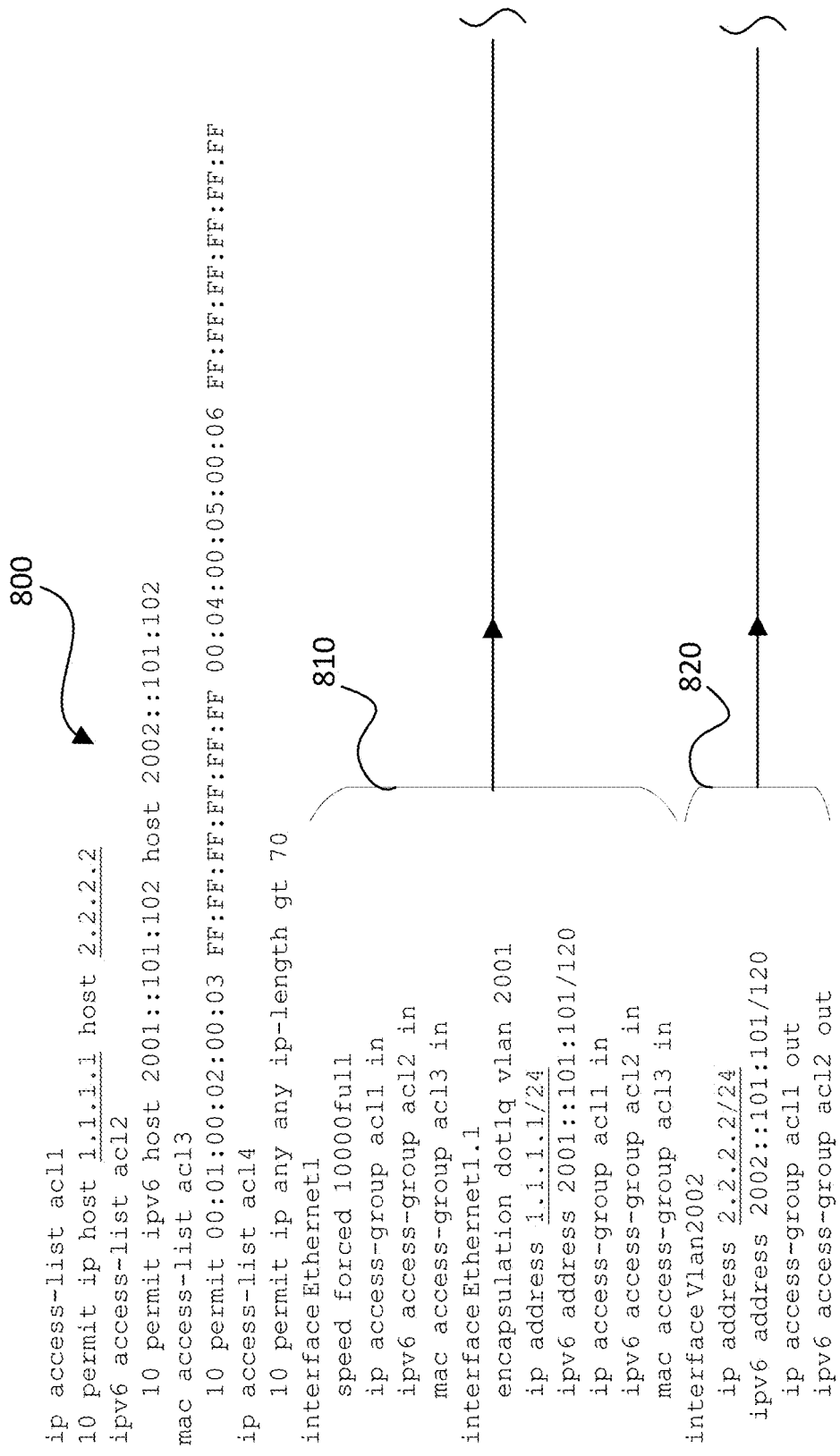
FIG. 8A is an exemplary ACL configuration.

FIG. 1 is a flowchart of a process for generating a TCAM profile according to some embodiments. At block 100, an ACL configuration (e.g., as shown in FIG. 8A) is received at a network device (e.g., server 610 of FIG. 6). The ACL configuration represents security and processing rules for handling the flow of network traffic in a network. In some embodiments, the configuration may be represented in formats other than as an ACL configuration. The ACL configuration may be formatted with rules for handling incoming or outgoing packets across a network or subnetwork including forwarding, dropping, recirculating, and other actions that may be based upon parameters/qualifiers including, for example, protocol, source/destination address, port, priority, and others. An ACL or similar configuration is typically formatted to specify the rules, actions, and parameters/qualifiers with particular types of terms organized in particular order.

In response to receiving the ACL configuration, a new TCAM profile is generated at block 110 for use in programming a TCAM to process network traffic. At block 120, the ACL configuration is parsed to identify TCAM profile features to be added to the TCAM profile. In some embodiments, a feature is based upon both a context and based upon a direction of traffic flow parsed from sections of the ACL configuration. A context may include a network interface and/or port (e.g., MAC, VLAN, etc.). A context may also include a routing configuration type such as security-based routing context or policy-based routing context. A direction may be based upon a packet flow direction (e.g., ingress/egress). For example, the ACL configuration of FIG. 8A illustrates sections 810 and 820, each including parameters identifying a port/interface (e.g., "2001," 2002," "mac") and a flow direction ("in," "out").

If, at block 120, a feature is identified, the configuration is further parsed at block 130 to identify one or more profile feature qualifiers and actions. Qualifiers may include parameters such as source and destination network addresses, ports, security parameters (e.g., encryption level/type), and/or priority (e.g., QoS). Like context and direction, these parameters/qualifiers may be parsed from the ACL configuration. For example, each of the sections 810 and 820, reference particular protocols (e.g., "ipv4," "ipv6") and IP addresses (e.g., "access-group") specified by an acl (e.g., "acl1," "acl2").

At block 130, actions associated with the feature are also parsed and identified. The Actions may be identified based from, for example, acl lists referenced in the parsed qualifiers. For example, "acl1," referenced in section 810 of the acl configuration identifies permitted host ip addresses ("permit ip host . . . ") and "acl2" identifies permitted ipv6 hosts. The resulting action identified is permission ("permit") of packets incoming from the identified hosts.

After the qualifiers/parameters/actions are identified at block 130, the profile feature is added to the TCAM profile at block 135. Features may be named/identified by their context and be given a sequence number to differentiate one feature from another. The feature may include a TCAM key size limit and a series of TCAM key fields that would be matched against entered parameters (e.g., obtained from a packet or results of a packet analysis). The action(s) identified from the parsing may be added in an "action" list such as the "count" action specified at 840 of FIG. 8B, indicating that packets which match with specified qualifiers/rules are counted such as in a flow counting feature of a network device.

After a feature is added at block 135, the ACL configuration is further parsed at block 120 to identify additional features, if any. At block 140, the features identified in the profile are qualified to determine if they are compatible with one or more TCAM(s). In some embodiments, the process determines if the combination of identified qualifiers can be combined into a TCAM key of a particular size. The resulting action(s) are similarly qualified to be compatible with specified TCAM table constraints. Further, in some embodiments, the process determines if the combination of features can be included within the dimensional constraints of one or more TCAM tables.

If the TCAM constraints limiting the combination of qualifiers and actions are exceeded, the process may halt generation of the profile at block 150 or modify generation of the profile. Modification may include, for example, automatically removing certain features, qualifiers, and/or actions. Alternatively, an operator may be prompted within a user interface to remove features, qualifiers, and/or actions in order to tailor the profile into compliance.

If not canceled at block 150, the generated profile is published at block 160. Publication may include generating a file and storing the file in an accessible location. The profile may be transmitted or utilized across a network for programming the TCAM tables of network devices. For example, a network server may receive the profile and, based upon the profile features, one or more TCAM(s) of network devices serviced by the server are programmed using the profile.

Figure 2:
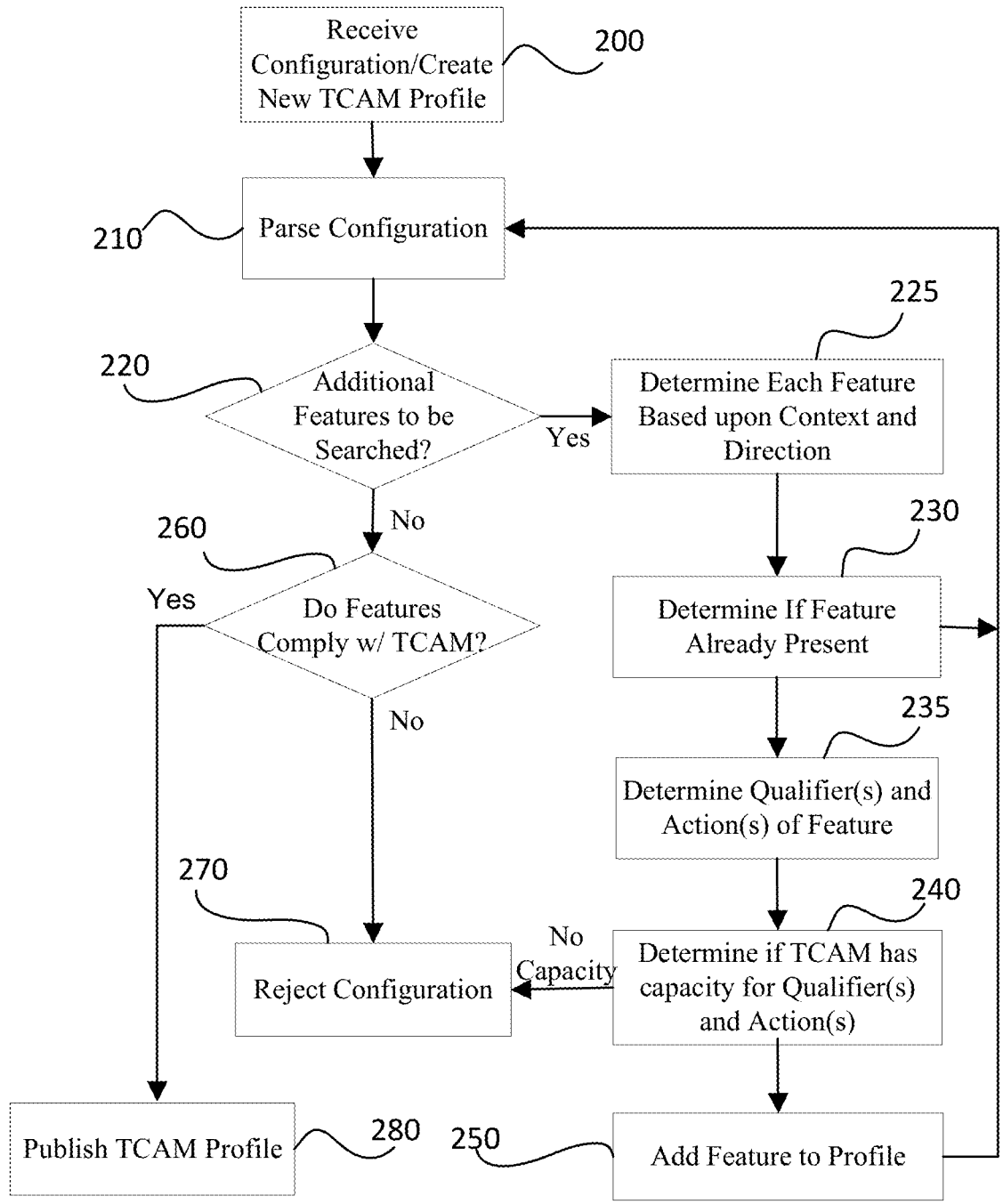
FIG. 2 is a flowchart of a process for generating a TCAM profile according to some embodiments.

In some embodiments, executable code is programmed in accordance with the following basic set of instructions:

Generate Empty TCAM Profile
For each Interface Configuration:
    Parse configuration for context and direction
If a context includes an applicable ACL then:
    Get feature name from context and direction of applied ACL
    If Feature not in TCAM profile:
    Add Feature to TCAM profile
Parse ACL to get a list of qualifiers and actions for Feature
    For each Feature
        If qualifier not present in Feature
            Add qualifier to Feature
For each Action
        If action not present in Feature
            Add action to Feature -continued If combination of feature parameters exceeds TCAM Key Size
    Fail Feature Generation
If combination of action results exceeds TCAM result field
Fail Feature Generation
    If combination of features exceeds size of TCAM limits
        Fail Profile Generation FIG. 2 is a flowchart of a process for generating a TCAM profile according to some embodiments. At block 200, a network configuration (e.g., an ACL configuration) is obtained, such as at a network server 610 shown in FIG. 6. At block 210, the configuration is parsed to determine if portions of the configuration have not been correlated with a TCAM profile feature. At block 225, if there is no additional portion of the TCAM profile to be parsed, the process continues to block 260 for qualification of the profile created thus far.

At block 225, the process continues by parsing portions of the configuration that have not been parsed for identification of a profile feature. In some embodiments, a feature is identified by a context and by a direction of packet flow such as described herein. In some embodiments, parsing and identification may be performed using a text parser that identifies particular words and expressions (e.g., utilizing commands in the JAVA or JSON programming languages). In some embodiments, a natural language processor (NLP) and/or artificial intelligence is utilized such as, for example, where a configuration is not constrained to expected formatting specifications.

At block 230, after a feature is identified at block 225, the process determines whether the feature has been previously added to the profile. Different parts of a configuration may have cumulative, overlapping, and/or inconsistent sections pertaining to a feature (e.g., based upon a context and direction). If a configuration section is cumulative and/or overlaps with a previously incorporated feature, the cumulative section may be omitted so that the same feature is not added multiple times to the profile. If a configuration section is inconsistent with a previously included feature, the process may prompt an operator to manually intervene with profile generation, cancel incorporation of the new feature, and/or cancel automated generation of the profile entirely.

At block 235, one or more qualifiers and actions corresponding to the feature are determined. As further described herein, qualifiers include parameters to be used in a TCAM key and actions include network processing functions based upon TCAM key matches. At block 240, the process determines if the qualifiers and actions are compliant with the constraints of one or more particular TCAM tables. If the constraints are exceeded, generation of the profile may be canceled at block 270 or the process may prompt an operator for input relating to modification or cancelation of the feature.

At block 250, if the feature is accepted, the feature is added to the TCAM profile. After adding the feature, the process will continue to parse the configuration for additional features at block 210. If no additional configuration sections require parsing, the profile may be further qualified at block 260 for compliance with one or more TCAMs. The process may determine if one or more TCAM tables of predetermined constraints can accommodate the combined set of features and actions in the profile. If the TCAM tables cannot accommodate the profile as generated, the profile may be rejected at block 270, an operator may be prompted to modify or cancel the profile, and/or automatic modifications to the profile (e.g., removal of certain types of features) may result.

At block 280, if the profile is not rejected, the profile is published. Publication may include, generating a file and storing the file in an accessible location. The profile may be transmitted or utilized across a network for programming the TCAM tables of network devices. For example, a network server may receive the profile and, based upon the profile features, one or more TCAM(s) of network devices serviced by the server are programmed using the profile.

Figure 3:
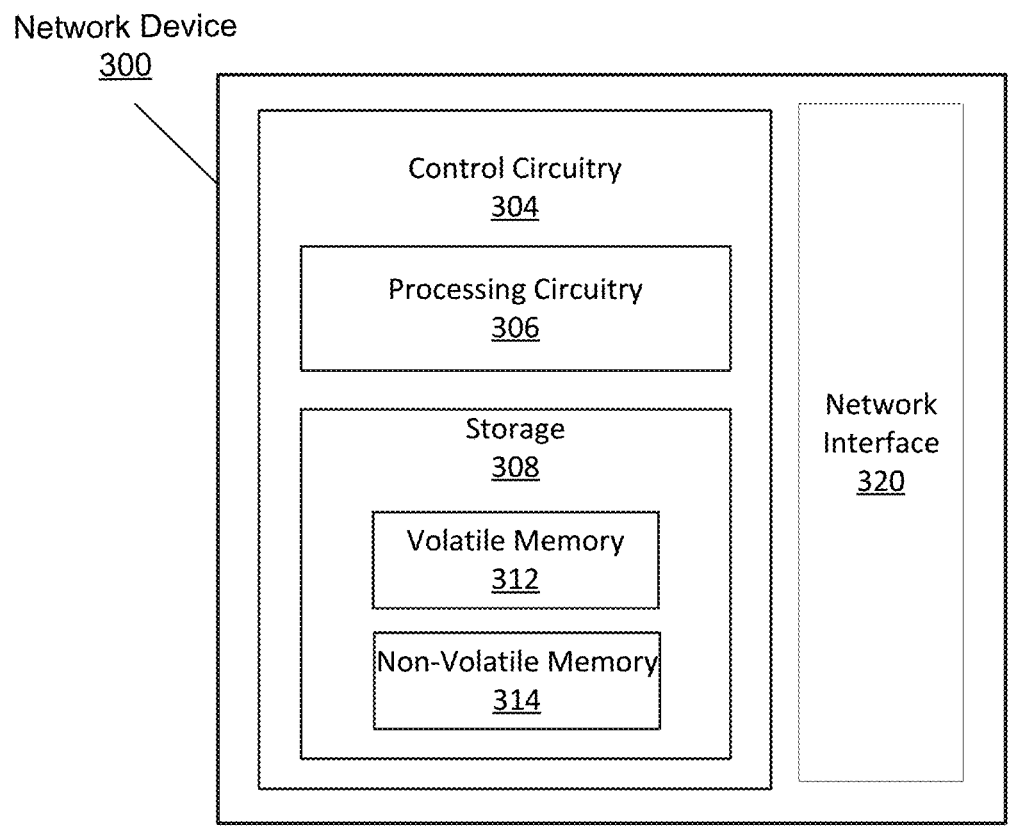
FIG. 3 is a block diagram of a network device configured to generate TCAM profiles according to some embodiments.

FIG. 3 is a block diagram of a device 300 configured to generate TCAM profiles according to some embodiments. Device 300 may represent a server (e.g., server 610 of FIG. 6) for generating TCAM profiles for TCAM tables and/or network devices (e.g., devices 640 and 643 of FIG. 6) in which the TCAM tables reside. Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer.

In some embodiments, processing circuitry 306 may be distributed across multiple separate processors or processing units, for example, multiple of the same type of processing units (e.g., two Intel Core i7 processors) or multiple different processors (e.g., an Intel Core i5 processor and an Intel Core i7 processor). A network interface 320 may be used to communicate with other devices in a network system (e.g., between devices 610, 643, 645, 660 and other devices across internet 670 of FIG. 6).

In some embodiments, control circuitry 304 executes instructions for generating and distributing TCAM profiles and other processing functions stored in memory (i.e., storage 308). The instructions may be stored in either a non-volatile memory 314 and/or a volatile memory 312 and loaded into processing circuitry 306 at the time of execution. A system for generating and distributing TCAM profiles (e.g., the system described in reference to FIG. 6) may be a stand-alone application implemented on a user device (e.g., end-user device 645 and 660 of FIG. 6) and/or a server (e.g., server 610 of FIG. 6) or distributed across multiple devices. The system may be implemented as software or a set of executable instructions. The instructions for performing any of the embodiments discussed herein for generating and distributing TCAM profiles may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, instructions in accordance with the processes of FIGS. 1, 2, 4, and 7 described herein may be stored in storage 308, and executed by control circuitry 304 of device 300.

Figure 4:
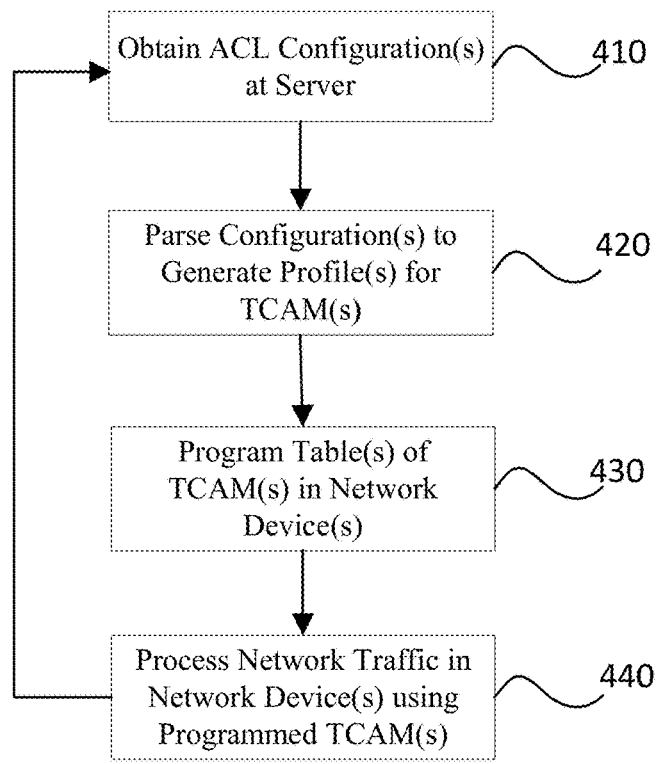
FIG. 4 is a flowchart illustrating programming a network device to utilize a dynamically generated TCAM profile according to some embodiments.
Figure 5:
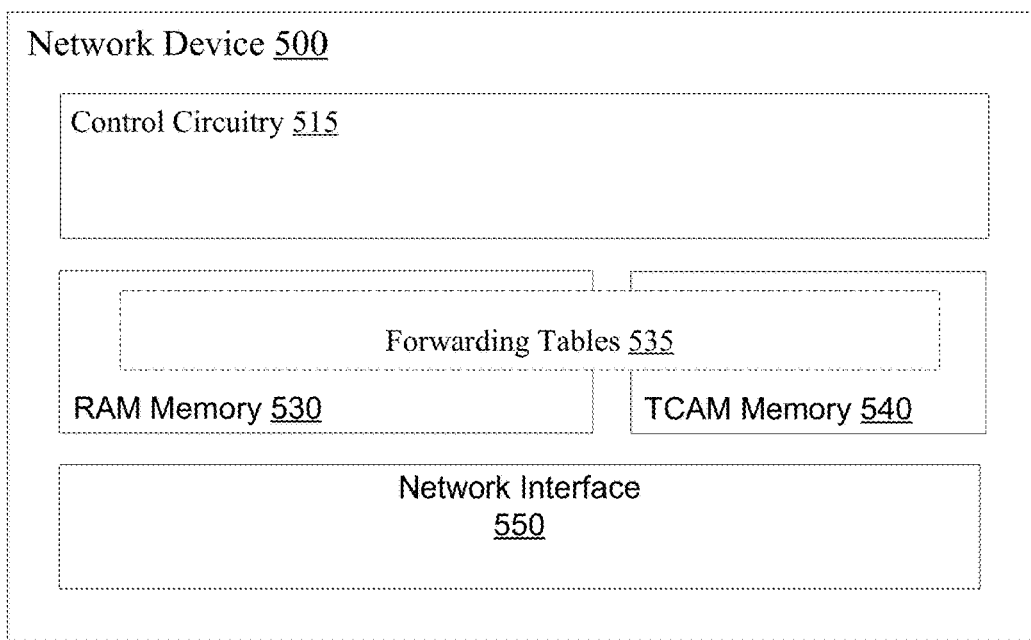
FIG. 5. is a block diagram of a network device configured to perform network processing based upon generated TCAM profiles, according to some embodiments.

FIG. 4 is a flowchart illustrating programming a network device to utilize a dynamically generated TCAM profile, according to some embodiments. FIG. 5. is a block diagram of a network device configured to perform network processing based upon generated TCAM profiles, according to some embodiments. At block 410, an ACL configuration is obtained such as at a network server (e.g., server 610 of FIG. 6). At block 420, the configuration is parsed to generate TCAM profiles such as further described herein. At block 430, using the generated TCAM profiles, TCAM tables of network devices (e.g., network device 500 of FIG. 5 and devices 640 and 643 of FIG. 6) are programmed utilizing the generated TCAM profiles.

Figure 8B:
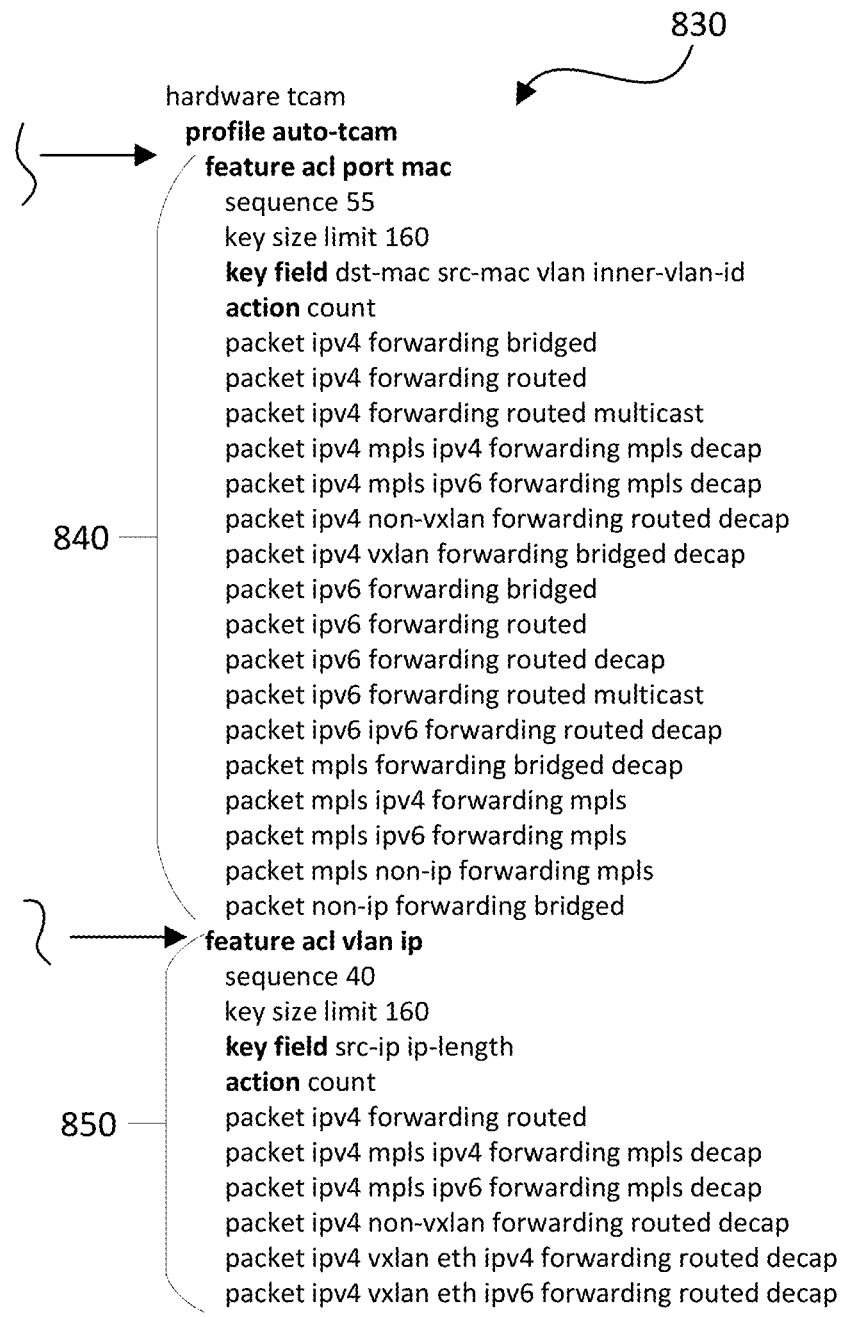
FIG. 8B is a TCAM profile based upon the ACL configuration of FIG. 8A and generated dynamically, according to some embodiments.

Network device 500 includes control circuitry 515 and forwarding tables 535 programmed and configured to process network traffic. Forwarding tables 535 may be retained in both RAM 530 and TCAM 540. The forwarding tables 535 in TCAM 540 may be programmed according to the TCAM profiles generated at block 430. A generated TCAM profile according to some embodiments (e.g., as shown in FIG. 8B) may be readily translated into TCAM table programming either manually or automatically such as described herein.

Once the TCAM tables of network devices are programmed using the TCAM profiles, they can process network traffic at block 440. Network interface 550 may receive and/or transmit network traffic processed with the use of forwarding tables 535 in TCAM memory 540. Additional ACL configurations may be received again at block 410 and further utilized to generate updated TCAM profiles and TCAM table programming in device 500.

Figure 6:
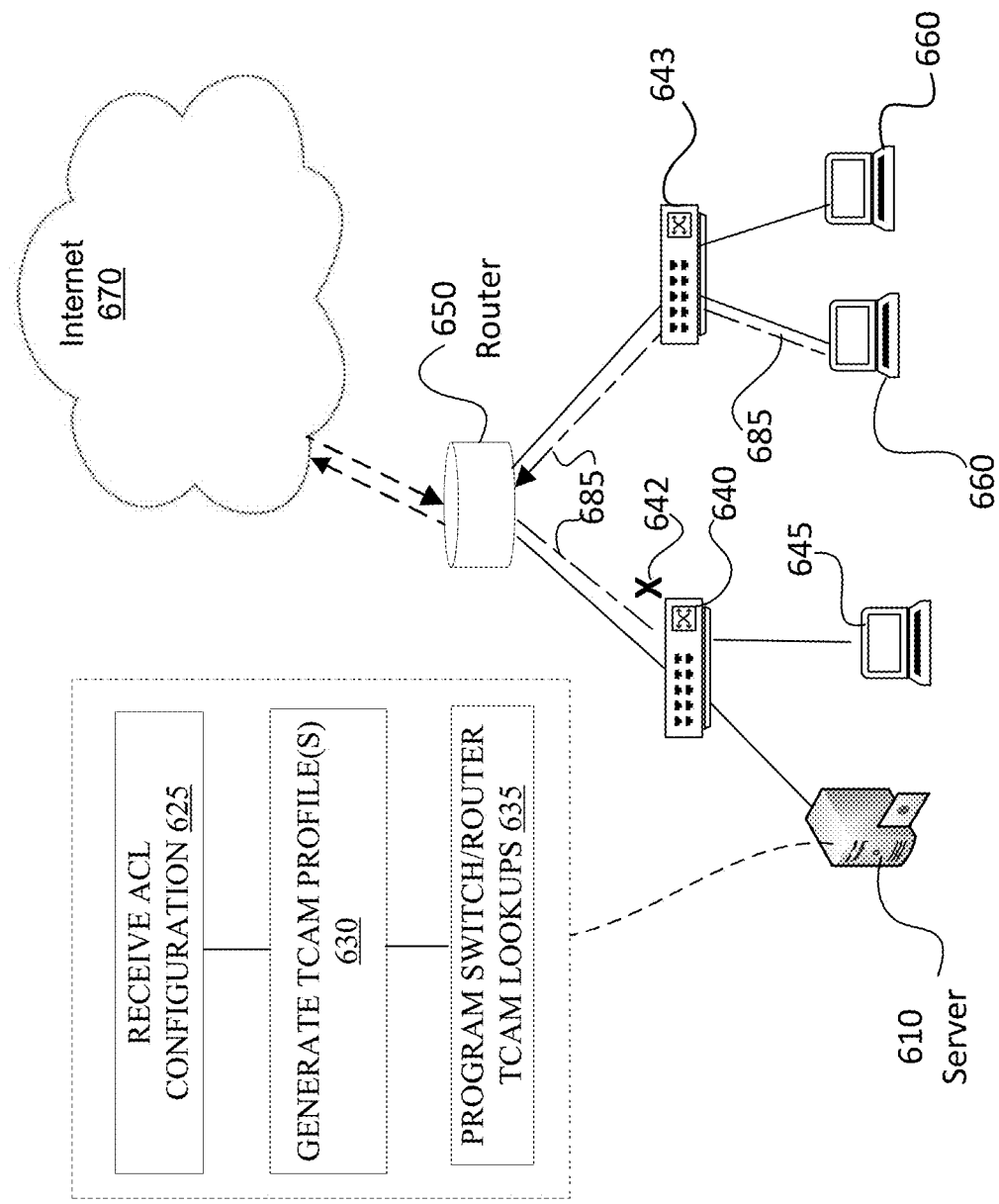
FIG. 6 is an exemplary network topology including network devices programmed with dynamically generated TCAM profiles according to some embodiments.

FIG. 6 is an exemplary network topology including network devices programmed with dynamically generated TCAM profiles. At a server 610, an ACL configuration is received and processed such as according to processing blocks 625, 630, and 635. Server 610 is connected to a network including a router 650, network devices 640 and 643, and end-user devices 645 and 660. The network may be further connected to an internet 670.

An ACL configuration is received at block 625 in server 610. At block 630, based upon the received ACLs, TCAM profiles are generated such as according to embodiments described herein. Utilizing the generated TCAM profiles, server 610 may be used, at block 635, to program the TCAM tables of devices 640, 643, and 650. In some embodiments, the programming may be performed automatically based upon the TCAM profiles and based upon the respective network topology (e.g., of FIG. 6). Additional forwarding tables not in a TCAM may also be programmed (e.g., automatically) such as according to the received ACL when, for example, the respective TCAM tables cannot completely accommodate the requirements of the ACL configuration.

After the TCAM tables of devices 640, 643, and 650 are programmed utilizing the generated TCAM profiles, they may process network traffic 685 by performing lookups in the programmed TCAM tables. For example, device 640 may include a TCAM table that denies permission for network traffic to be forwarded to devices 610 and 645 from devices 660. As a result of a corresponding lookup in a TCAM table of device 640, traffic 685 may be blocked/dropped by network device 640 at 642.

Figure 7:
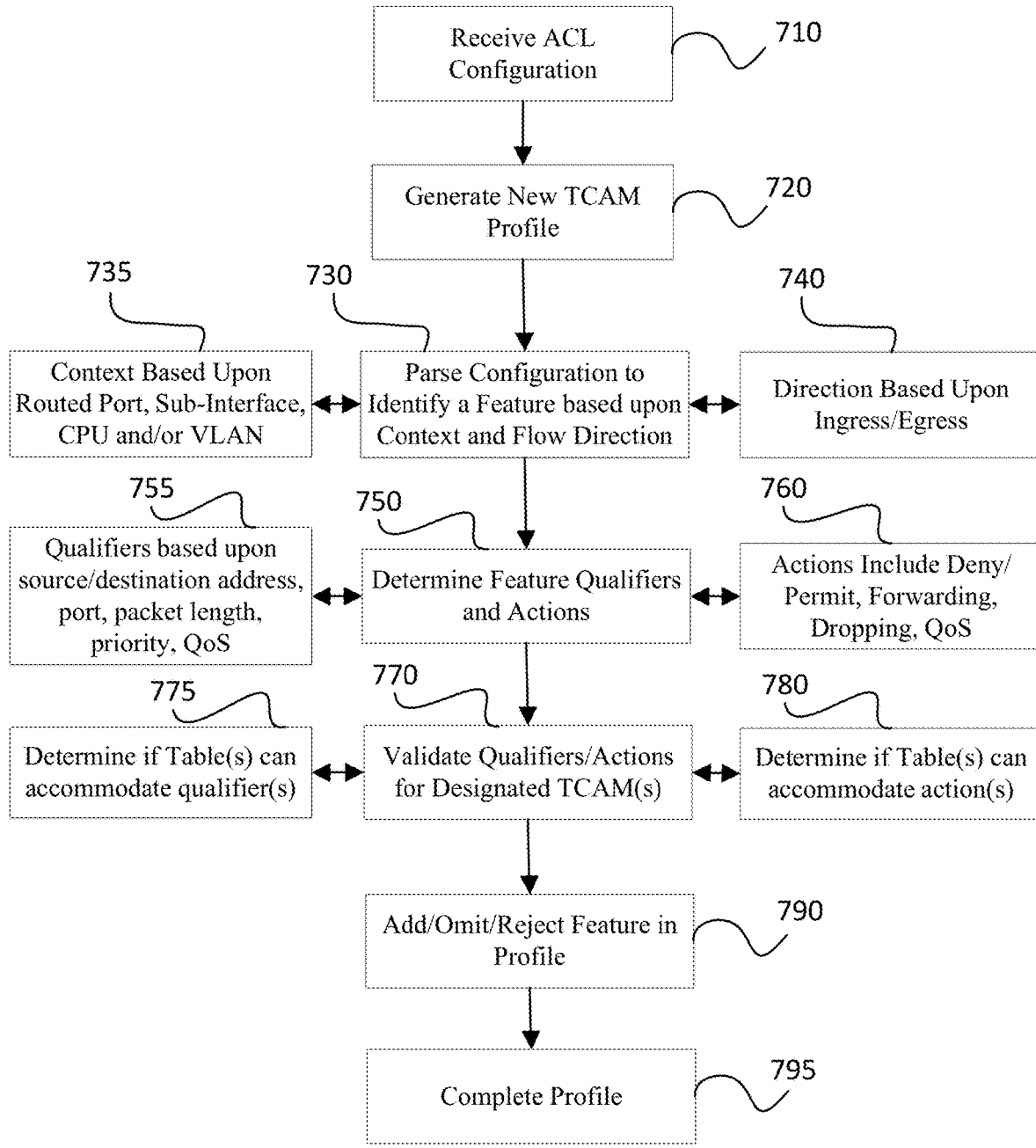
FIG. 7 is a flowchart of a process for generating a TCAM profile according to some embodiments.

FIG. 7 is a flowchart of a process for generating a TCAM profile according to some embodiments. At block 710, an ACL configuration is obtained such as at a network server (e.g., server 610 of FIG. 6). In response to receiving an ACL configuration, a TCAM profile is generated at block 720. At block 730, the configuration is parsed to identify TCAM profile features. In some embodiments, the features are based upon identifying a particular context and flow direction by using the parsing, such as further described herein. At block 735, a context is identified based upon a particular interface (e.g., a port, sub-interface, CPU, and/or VLAN) identified in the configuration. At block 740, a direction of packet flow (if any) is further identified with respect to the identified interface. Based upon the identified context and flow direction, a feature may be assigned.

At block 750, the configuration is further parsed to identify qualifiers and actions pertaining to the feature assigned at block 730. At block 755, qualifiers (to be utilized in TCAM keys) are identified and may include, for example, source/destination address, port, packet length, priority, QoS, etc. At block 760, actions (to be selected in response to TCAM key matches) are identified and may include, for example, directions to permit/deny the forwarding of packets, to prioritize packets, to recirculate packets, etc.

At block 770, the qualifiers and actions that were identified at block 750 are validated to determine if they are compliant with specific TCAM constraints. At block 775, the process determines whether the identified qualifier(s) for the feature can be combined in a TCAM table key of a particular memory size (e.g., in bytes). At block 780, the process determines if the identified action(s) can be combined in an action memory field of the TCAM. In some embodiments, the maximum key size and/or action memory size is obtained from the ACL configuration, a separate configuration indicating TCAM constraints, and/or from devices with a TCAM to be programmed with the TCAM profile.

Based upon validating the qualifiers and actions at block 790, the respective feature is added to or omitted from the TCAM profile, or generation of the profile may be canceled if the feature's qualifiers/actions do not conform with a respective TCAM's constraints. In some embodiments, an operator may be prompted for instructions to handle (e.g., cancel/modify) a feature or profile with non-compliant qualifiers and/or actions.

At block 795, a TCAM profile generation is completed after each potential feature in the configuration is processed as described above. In some embodiments, a file including the profile is generated. In some embodiments, the file may be formatted so that it is readily converted into TCAM table entries in a network device. The file may be formatted in a manner shown in FIG. 8B, for example. In some embodiments, a process automatically programs a respective TCAM table based upon the generated TCAM profile.

FIG. 8A is an exemplary ACL configuration 800. FIG. 8B is a TCAM profile 830 based upon the ACL configuration of FIG. 8A and generated dynamically, according to some embodiments. A section 810 is directed to a MAC interface for ingress traffic as identified by a parsing process such as described herein (e.g., in FIGS. 1-4 and 7). Parsing section 810 results in a TCAM profile feature 840. For example, a feature "ad port mac" includes a "key field" that is specified at 850 of FIG. 8B, based upon parsing the identified ads (e.g., "acl1," "acl2") for an interface of the ACL configuration in FIG. 8A. The "key field" parameters include a destination MAC address ("dst-mac"), "source MAC address ("src-mac"), and an internal VLAN identifier ("inner-vlan-id"). A separate section 820 of configuration 800 is also identified by the parsing process, which results in a feature directed to a VLAN interface for egress traffic.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A computer-implemented method for generating a potential ternary content addressable memory (TCAM) profile:
   obtaining a proposed access control list (ACL) configuration;
   parsing the ACL configuration to identify a first feature, said first feature comprising a first context and a first direction of packet flow, the context including an interface type and a routing configuration type;
   based upon identifying the first feature, assigning the first feature to the potential TCAM profile, then:
      parsing the ACL configuration to identify an entry for at least one first qualifier and an entry for at least one first action associated with the first feature; and
      in response to identifying the at least one first qualifier and the at least one first action, joining the at least one first qualifier and the at least one first action with the first feature in the potential TCAM profile;
   parsing the ACL configuration to identify at least one additional feature, said at least one additional feature comprising a second context and a second direction of packet flow;
   based upon identifying the at least one additional feature, assigning the at least one additional feature to the potential TCAM profile, then:
      parsing the ACL configuration to identify an entry for at least one second qualifier and an entry for at least one second action associated with the at least one additional feature; and
      in response to identifying the entry for the at least one second qualifier and the entry for the at least one second action, joining the at least one second qualifier and the at least one second action with the at least one additional feature in the potential TCAM profile;
   testing the potential TCAM profile against one or more TCAM constraints;
   only programming the TCAM profile into a network device when the potential TCAM profile passes the test and cancelling the generation of the potential TCAM profile when it does not pass the test against the one or more TCAM constraints,
   wherein the test is based on available memory space for the first feature or the at least one additional feature in a TCAM of a network device.

2. A method for generating a potential CAM profile for programming a content addressable memory (CAM) of a network device:
   obtaining an access control list (ACL) configuration;
   parsing the ACL configuration to identify a first feature, said first feature comprising a first routing context and a first direction of packet flow;
   based upon identifying the first feature, assigning the first feature to the potential CAM profile, then:
      parsing the ACL configuration to identify an entry for at least one first qualifier associated with the first feature;
      parsing the ACL configuration to identify an entry for at least one first action associated with the first feature; and
      in response to identifying the entry for the at least one first qualifier and the entry for the at least one first action, linking the at least one first qualifier and the at least one first action with the first feature in the potential CAM profile;
   parsing the ACL configuration to identify at least one additional feature, said at least one additional feature comprising a second routing context and a second direction of packet flow;
   based upon identifying the at least one additional feature, assigning the at least one additional feature to the potential CAM profile, then:
      parsing the ACL configuration to identify an entry for at least one second qualifier associated with the at least one additional feature;
      parsing the ACL configuration to identify an entry for at least one second action associated with the at least one additional feature; and
      in response to identifying the entry for the at least one second qualifier and the entry for the at least one second action, linking the at least one second qualifier and the at least one second action with the at least one additional feature in the potential CAM profile; and
   determining if the potential CAM profile should be programmed in a forwarding table of the CAM;
   wherein the determining comprises calculating a memory space needed in a CAM table entry to program a lookup of the at least one first qualifier, the at least one second qualifier, the at least one first action, and the at least one second action; and
   in response to determining that the calculated memory space exceeds a space available in the CAM of the network device, performing at least one of terminating or modifying the generation of the potential CAM profile.

3. The method of claim 2 wherein the first routing context or the second routing context comprises a network interface type or a network routing configuration type.

4. The method of claim 2 wherein the first routing context or the second routing context comprises at least one of a routed port, a network sub-interface, a control plane, and a virtual local area network (VLAN).

5. The method of claim 2 wherein the first direction of packet flow or the second direction of packet flow comprises at least one of an ingress or egress of the flow from or to at least a portion of a network.

6. The method of claim 2 wherein the CAM comprises a ternary content addressable memory (TCAM).

7. The method of claim 2 wherein the at least one first qualifier or the at least one second qualifier comprises one or more of a source or destination network address, a source or destination network port, a network protocol, a packet length, a priority designation, and a quality of service (QoS) designation.

8. The method of claim 2 wherein the at least one first action or the at least one second action comprises one or more of a packet forwarding function, packet routing function, mirroring function, unicast reverse path forwarding function, or quality of service (QoS) function.

9. The method of claim 2 wherein, determining if the potential CAM profile should be programmed in the forwarding table of the CAM further comprises:
   calculating a memory space needed in a CAM table entry to program a lookup for the first feature and the at least one additional feature in the CAM profile; and
   in response to determining that the calculated memory space exceeds a space available in the CAM of the network device, performing at least one of terminating or modifying the generation of the potential CAM profile.

10. The method of claim 2 wherein, determining if the potential CAM profile should be programmed in the forwarding table of the CAM further comprises:

determining if the first feature or the at least one additional feature is already present in the CAM profile;

in response to determining that the first feature or the at least one additional feature is already present in the CAM of the network device, omitting an incorporation of the first feature or the at least one additional feature in the potential CAM profile.

11. The method of claim 2 further comprising:

programming the potential CAM profile in the forwarding table of the CAM of the network device; and operating the network device to execute at least one computer networking action based upon performing a lookup from the programmed CAM profile.

12. A system for generating a potential ternary content addressable memory (TCAM) profile for processing network communications, the system comprising:

one or more processors programmed and configured to perform:

obtaining an access control list (ACL) configuration;

parsing the ACL configuration to identify a first feature, said first feature comprising a first routing context and a first direction of packet flow;

based upon identifying the first feature, assigning the first feature to the potential TCAM profile, then:

parsing the ACL configuration to identify an entry for at least one first qualifier associated with the respective configuration feature;

parsing the ACL configuration to identify an entry for at least one action associated with the first feature;

in response to identifying the entry for the at least one first qualifier and the entry for the at least one first action, linking the at least one first qualifier and the at least one first action with the first feature in the potential TCAM profile;

parsing the ACL configuration to identify at least one additional feature, said at least one additional feature comprising a second routing context and a second direction of packet flow;

based upon identifying the at least one additional feature, assigning the at least one additional feature to the potential TCAM profile, then:

parsing the ACL configuration to identify an entry for at least one second qualifier associated with the at least one additional feature;

parsing the ACL configuration to identify an entry for at least one second action associated with the at least one additional feature; and in response to identifying the entry for the at least one second qualifier and the entry for the at least one second action, linking the at least one second qualifier and the at least one second action with the at least one additional feature in the potential TCAM profile; and determining if the potential TCAM profile should be programmed in a forwarding table of the TCAM;

wherein the determining comprises calculating a memory space needed in the TCAM to program a lookup of the at least one first qualifier, the at least one second qualifier, the at least one first action, and the at least one second action; and in response to determining that the calculated memory space exceeds a space available in the TCAM, performing at least one of terminating or modifying the generation of the potential TCAM profile; and a network device having a TCAM configured to be programmed with the potential TCAM profile when it is determined that the potential TCAM profile should be programmed, the network device programmed and configured to execute at least one networking action based upon performing a lookup from the TCAM profile programmed in the TCAM.

13. The system of claim 12 wherein the first routing context or the second routing context comprises a network interface type or a network routing configuration type.

14. The system of claim 12 wherein the first routing context or the second routing context comprises at least one of a routed port, a network sub-interface, a control plane, and a virtual local area network (VLAN).

15. The system of claim 12 wherein the first direction of packet flow or the second direction of packet flow comprises at least one of an ingress or egress of the flow from or to at least a portion of a network.

16. The system of claim 12 wherein the at least one first qualifier or the at least one second qualifier comprises one or more of a source or destination network address, a source or destination network port, a network protocol, a packet length, a priority designation, and a quality of service (QoS) designation.

17. The system of claim 12 wherein the at least one first action or the at least one second action comprises one or more of a packet forwarding function, packet routing function, mirroring function, or quality of service (QoS) function.

18. The system of claim 12 wherein determining if the potential TCAM profile should be programmed in the forwarding table of the TCAM further comprises:

calculating a memory space needed in the TCAM to program a lookup for the first feature and the at least one additional feature in the TCAM profile; and in response to determining that the calculated memory space exceeds a space available in the TCAM, performing at least one of terminating or modifying the generation of the potential TCAM profile.

19. The system of claim 12 wherein determining if the potential TCAM profile should be programmed in the forwarding table of the TCAM further comprises:

determining if the first feature or the at least one additional feature is already present in the TCAM profile;

in response to determining that the first feature or the at least one additional feature is already present in the TCAM of the network device, omitting an incorporation of the first feature or the at least one additional feature in the potential TCAM profile.

20. The system of claim 12 wherein the one or more processors are programmed and configured to further perform:

operating the network device to execute at least one computer networking action based upon performing a lookup from the programmed TCAM profile.

21. The method of claim 1, wherein testing the potential TCAM profile against one or more TCAM constraints further comprises:

calculating a memory space needed in a TCAM table entry to program a lookup of the at least one first qualifier, the at least one second qualifier, the at least one first action, and the at least one second action.

* * * * *